United States Patent [19]

Nangle et al.

[11] Patent Number: 4,558,880

[45] Date of Patent: Dec. 17, 1985

[54] COUPLING MEMBER

[75] Inventors: Terry Nangle; John Nangle, both of Caversham, Australia; Salih Kazim, 19 Hibberta Ct., Forrestfield Heights, Western Australia, Australia, 6058

[73] Assignee: Salih Kazim, Forrestfield Heights, Australia

[21] Appl. No.: 496,550

[22] Filed: May 20, 1983

[51] Int. Cl.[4] .............................................. B60D 7/02
[52] U.S. Cl. ...................................... 280/457; 70/93; 70/101; 292/264
[58] Field of Search .................. 280/457; 70/101, 103, 70/93; 292/264

[56] References Cited

U.S. PATENT DOCUMENTS

| 612,138 | 10/1898 | Reeve | 292/264 |
| 1,329,723 | 2/1920 | Muennich | 292/264 X |
| 2,985,476 | 5/1961 | Tiffany | 292/1 |
| 3,125,355 | 11/1961 | Snuggins | 280/457 |
| 3,132,878 | 5/1964 | Puydt et al. | 280/457 |
| 4,106,800 | 8/1978 | Nakanishi | 292/264 |

FOREIGN PATENT DOCUMENTS

| 683658 | 4/1964 | Canada. |
| 843293 | 6/1970 | Canada. |
| 7730 | of 1898 | United Kingdom. |

Primary Examiner—Joseph F. Peters, Jr.
Assistant Examiner—Charles R. Watts
Attorney, Agent, or Firm—Laurence R. Brown

[57] ABSTRACT

The present invention relates to a coupling member which comprises a first slotted member and a second key member, wherein the second key member is arranged to be inserted in to the slot of the first member and to be latched to the first member upon being partially rotated. The coupling member of the present invention is particulary envisaged for use as a secondary safety coupling between a towing vehicle and a trailer which are coupled by a primary coupling such as a ball and socket coupling.

3 Claims, 6 Drawing Figures

COUPLING MEMBER

The present invention relates to a coupling member.

When trailers such as boat trailers or caravans are towed by a vehicle, the primary couple is between a tow bar with a socket mounted on the trailer and a ball mounted on the towing vehicle. However, there are often provided in addition safety chains which are mounted on the trailer. The safety chains are connected to the towing vehicle at a point adjacent the towing ball by means of shackles.

The use of shackles to connect the safety chain can be highly inconvenient. For example, the shackles include threaded connections which can become rusted in use and it is very time consuming to fasten and undo the threaded connections. Also, the nuts of the threaded connections are easily lost.

The present invention provides a coupling member for a chain which is easier to use than shackles whilst providing an efficient couple.

In accordance with the present invention there is provided a coupling member which comprises a first slotted member and a second key member, wherein the second key member is arranged to be inserted into the slot of the first member and to be latched to the first member upon being partially rotated. The first slotted member is typically arranged to be affixed to a towing vehicle or a stationary article while the second key member is typically arranged to be affixed to a chain or other non-rigid connecting means.

The present invention will be described with particular reference to safety chains for use with trailers coupled to a towing vehicle but it should be appreciated that it is of general applicability. For example, it could be used in relation to a gate to provide a means for ensuring that the gate remained closed. Also, the slotted member could be built into the front of a boat and the key member inserted into the slotted member. They key member would be attached to a chain mounted on a winch so that the coupling member could be used to winch the boat onto a trailer. Preferably, the slotted member would be rounded to form a horseshoe or half-moon shape for safety reasons.

Typically, a trailer comprises a pair of lengths of chain extending from its forward end. In the present invention, a key member is affixed to the free end of each length of chain. Preferably, each key member is flat and may be stamped out of metal. Each key member may comprise a first wide body portion at a first end, an intermediate narrow neck portion and a wide bar portion generally at right angles to the neck portion at a second end.

Conveniently, the key member is affixed to the free end of a length of chain at the first end thereof by welding the end link of the chain to the body member. Preferably, the end of the body member is shaped to conform with the shape of the end link of the length of chain to provide a strong weld joint.

The slotted member is preferably flat and may be stamped out of metal. The slot in the first member is elongated to enable the bar portion of the key member to be passed through it. Further, the slot is preferably arranged to be substantially vertical in use. Still further, the slot preferably contains an enlarged portion. The enlarged portion is so dimensioned as to enable the neck portion to be rotated within the slot after the bar portion has been passed through the slot. The remainder of the slot is preferably so dimensioned as to prevent rotation of the neck portion within it.

In use, a trailer typically has two chains with respective free ends or a single length of chain with two free ends. In either case, a key member of the present invention is affixed to each end as described above.

Further, the slotted member is affixed to a towing vehicle as described.

To affix the chains to the towing vehicle the key member are engaged with the slotted member by inserting each bar member through the slot so that the neck portion is within the slot, and then partially rotating the neck members, such as through 90°, within the slot so as to cause the bar member to engage behind the slotted member.

As described above, the slot is preferably vertical in use, so that the two key members normally rest one above the other in the bottom of the slot. Therefore, one bar portion may be shorter than the other bar portion. In use, the shorter bar portion key member is preferably disposed below the longer bar portion key member in the slot.

Further, the length of the slot is preferably such that only the shorter bar portion can be rotated and removed through the slot when the two key members are engaged with the slotted member. Thus, the larger bar portion cannot be removed when the shorter bar portion is in its engaged position. When the longer bar portion is overlying the shorter bar portion it tends to hold the shorter bar portion down and prevent it being inadvertently rotated and disengaged. This is an added safety factor and has the advantage of making it difficult for children to disconnect the safety chain or chains from the towing vehicle.

The present invention will now be described, by way of example, with reference to the accompanying drawings, in which.

Figure 1:
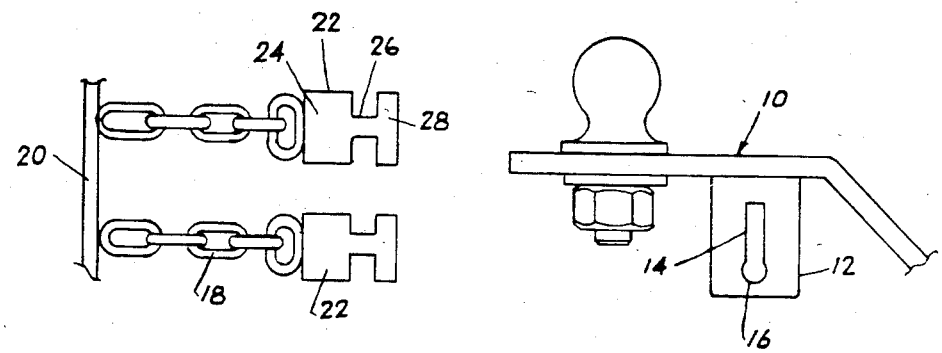
FIG. 1 is a schematic side elevation of a coupling member of the present invention in use in relation to a towing vehicle and trailer combination.
Figure 2:
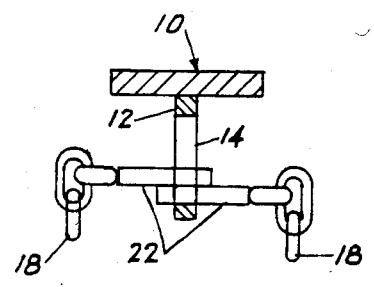
FIG. 2 is a sectional end elevation through a tow bar and slotted member of FIG. 1 with a pair of key members in place.
Figure 3:
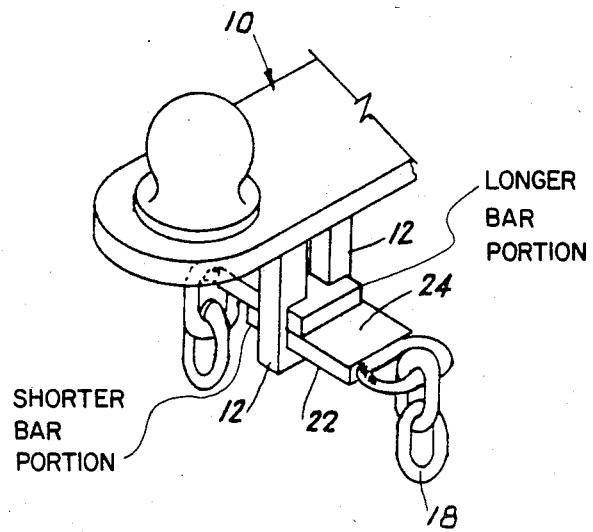
FIG. 3 is an upper perspective view of the tow bar and slotted member assembly of FIG. 2.

In FIGS. 1 to 3, there is shown a tow bar 10 which is typically attached to a towing vehicle in conventional manner. Underneath the tow bar 10 there is welded a flat metal member 12 provided with a vertical slot 14. The slot 14 has an enlarged portion 16 at its bottom end. The member 12 is conveniently stamped out of metal.

There is also shown a pair of chains 18 attached to a trailer 20 (only part of which can be seen). Each chain 18 has a free end and a flat metal key member 22 is welded to each free end. Each key member 22 comprises a first wide body portion 24 at a first end, an intermediate narrow neck portion 26 and a wide bar portion 28 extending at right angles to the neck portion at a second end. The key members 22 are conveniently stamped out of metal.

To attach the chains 18 to the tow bar 10, the key members 22 are inserted sequentially in the slot 14. To do this a first key member 22 is presented to the slot 14 with the bar portion 28 aligned with the slot 14. The key member 22 is then lowered until the neck portion 26 is in the enlarged portion 16 of the slot 14. The key member 22 can be rotated so that the bar portion 28 is at right angles to the slot 14 (see FIGS. 2 and 3) and the key member is thus latched to the slotted member. Then, the first key member 22 is raised to the top of the slot 14 and a further key member 22 is presented in similar manner to the slot 14 preferably from the other side of the members 12 (see FIGS. 2 and 3). The further key member 22 is also inserted and rotated as described for the first key member 22 so that they lie one above the other in the slot 14. It should be noted that the neck portions 26 and slots 14 are so dimensioned that the key member 22 can only be rotated in the slot 14 in the enlarged portion 16 thereof. The fact that the two key members 22 lie one above the other in the slot 14 inhibits rotation of the lowermost key member 22 and thus reduces the possibility of it becoming accidentally disengaged. To remove the key members 22 from the slot 14, the reverse procedure to that described above is carried out.

Also, in the event that the tow bar becomes disengaged from the trailer in use, it is found that the chains 18 can act as a support for the front end of the trailer and prevent it from contacting the road at speed.

Figure 4:
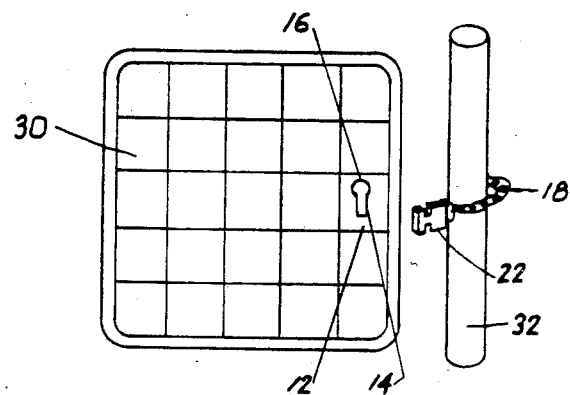
FIG. 4 is a front elevation of a gate and post combination provided with a coupling member of the present invention.
Figure 5:
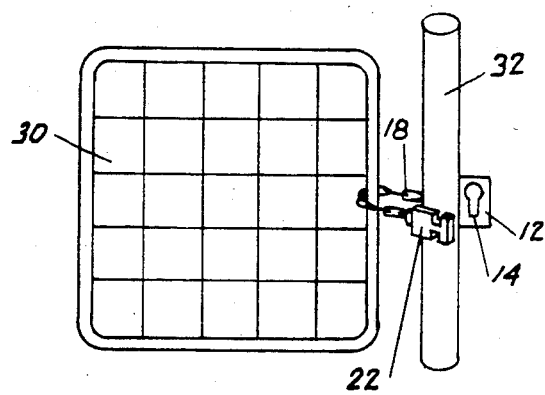
FIG. 5 is a front elevation of another embodiment of gate and post combination provided with a coupling member of the present invention.

In FIGS. 4 and 5 like reference numerals denote like parts to those found in FIGS. 1 to 3.

In FIG. 4 there is shown a gate 30 provided with a slotted member 12 similar to that described above in relation to FIGS. 1 to 3. It should be noted that the enlarged portion 16 is uppermost. A post 32 has a single chain 18 attached to it and a key member 22 is welded to the free end of the chain 18.

In use, the key member 22 is inserted in the slot 14 as described hereinabove except that it is rotated at the top of the slot at 16 and allowed to drop to the bottom under the influence of gravity. If an animal such as a pig, tries to unlatch the gate 30 by lifting the key member 22 from the side thereof it is found that the key member 22 adopts a position in the narrow portion of the slot 14 in which it is laterally inclined in a position between the horizontal and the vertical. This prevents any further movement towards the enlarged portion 16 and thus rotation and disengagement of the key member 22 is prevented.

In FIG. 5, there is shown an embodiment similar to that of FIG. 4 except that the slotted member 12 is mounted on the post 32 and the chain 18 is passed through an opening in the gate 30 to latch the gate 30 as described above.

Figure 6:
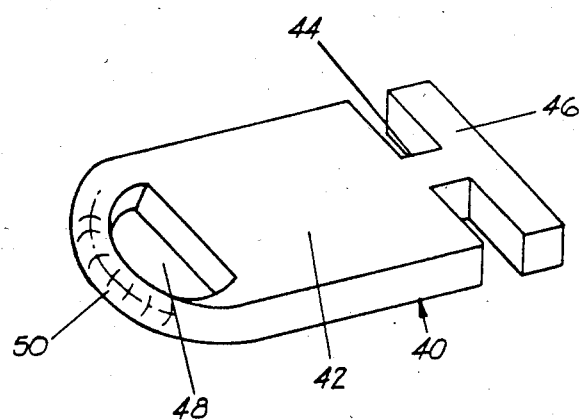
FIG. 6 is an upper perspective view of a modified form of key member in accordance with the present invention.

In FIG. 6 there is shown a modified flat metal key member 40. The key member 40 is intended to replace a key member 22. The key member 40 comprises an intermediate wide body portion 42, an intermediate narrow neck portion 44 adjacent the body portion 42. A wide bar portion 46 is located at one end of the key member 42 adjacent the narrow neck portion 44. The key member 40 is also conveniently stamped out of metal.

The key member 40 further comprises an aperture 48 adjacent the end of the key member 40 remote from the wide portion 46. Preferably, the outer end of the aperture 48 is defined by a curved loop 50.

Preferably, in the stamping process the loop 50 is formed with a substantially circular profile. This is because the aperture 48 is used to receive an open end link of a chain (not shown) comprising a series of links. The end link of the chain is closed such as by welding or any equivalent known means once the open link has been passed through the aperture 48.

If loop 50 is too angular in cross-section it tends to be worn away at its corners by the chain links in use. Therefore, the substantially circular profile is preferred to reduce this wear.

The use of the aperture 48 obviates the need to weld the end link of the chain directly to the key member as is described above in relation to FIGS. 1 to 5. It is found that the need to make this weld increases the cost of manufacturing the coupling member of the present invention to an unacceptable level because of the costly inspection procedures that are required. The use of the aperture 48 and the closing of an end link of a chain by known means is a much more dependable procedure which reduces manufacturing costs substantially.

It is envisaged that the coupling member of the present invention could also be used as a lifting device and, as described above, for winching boats and for many other purposes.

Modifications and variations such as would be apparent to a skilled addressee are deemed within the scope of the present invention. For example, the chains 18 could be replaced by any equivalent non-rigid connecting means.

We claim:

1. A coupling device comprising a flat slotted member containing an elongated slot of predetermined width and length and a pair of flat key members, each said key member comprising a wide body portion, an intermediate narrow neck portion of a width for registering in the slot without rotation and a wide flat bar portion substantially at right angles to the neck portion and at an end remote from the wide body portion, said wide body portion of each key member being attached to a respective flexible element, and the elongated slot of said flat slotted member being orientated vertically and containing an enlarged portion of greater width than the remainder of the slot positioned at the lowermost end of the slot to receive rotatably therein the neck portion of only one key member at a time with the remainder of the slot being too narrow to allow rotation of the neck portion, and two key members engaged in the slot to lie one above the other in the slot with the upper key inhibiting rotation of the lower key, whereby each key is engaged sequentially with said slot by aligning the bar portions with said slot, and passing each flat bar portion through the slot, moving the neck portion downwardly until it is in the enlarged portion of the slot and rotating the key so that its bar portion engages the slotted member to prevent withdrawal of the key from the slot.

2. A coupling member according to claim 1, wherein a first one of the key members has a bar portion which is shorter than the bar portion of the other of the key members, the longer bar portion of the one key member being of a length such that that key member can not be rotated when the first key member is located in the slot, whereas the bar portion of the first key member is short enough for the first key member to be rotated in the slot when the other key member is located in the slot such that the two key members may be disposed in the slot only when the first key member is disposed lowermost in the slot.

3. A combination as defined in claim 1, further including a motor vehicle tow bar and trailer attachment combination wherein the tow bar is provided with said flat slotted member and said pair of flat key members are attached by means of respective flexible elements to the trailer attachment.

* * * * *